J. P. CLARY VON CARLSBERG.
PICTURE FRAME.
APPLICATION FILED APR. 4, 1918.

1,275,662. Patented Aug. 13, 1918.

Inventor
J. P. Clary Von Carlsberg

By
Attorney

UNITED STATES PATENT OFFICE.

JOHN P. CLARY VON CARLSBERG, OF WORCESTER, MASSACHUSETTS.

PICTURE-FRAME.

1,275,662.     Specification of Letters Patent.     Patented Aug. 13, 1918.

Application filed April 4, 1918. Serial No. 226,611.

*To all whom it may concern:*

Be it known that I, JOHN P. CLARY VON CARLSBERG, a citizen of the United States of America, residing at Worcester, in the county of Worcester and State of Massachusetts, have invented certain new and useful Improvements in Picture-Frames, of which the following is a specification.

This invention relates to new and useful improvements in picture frames and has for its object the provision of a frame which is simple in construction and one which will be cheap to manufacture.

The primary object of this invention is the provision of a frame of such construction as to render the mounting of pictures, mirrors or the like within the frame without necessitating the driving of nails or other fastening means directly into the frame consequently obviating the splitting or marring of the frame during the mounting process.

A further object of the invention is the provision of a frame of such construction that the glass, picture, and its backing may be easily mounted in the frame and retained therein by suitable elements which obviate the necessity of driving fastening means directly into the frame.

A further object of the invention is the provision of a combined retaining and supporting element which is so associated with the frame as to hold the pictures or like articles within the frame and prevent such articles from shifting after once mounted.

A further object of the invention is the provision of a frame of such construction that the glass cover for pictures when mounted in the frame may have sufficient room for expansion or contraction.

A further object is the provision of a frame having rotatably mounted thereon a combined supporting and rotating element which is so secured to the frame as to permit the frame to be moved at various angles with relation to the supporting element and this combined supporting and retaining element constituting the means for retaining the mountings such as mirrors, pictures, or the like within the frame.

With these and other objects in view, the invention consists in the novel combination and arrangement of parts which will be hereinafter more fully described and set forth in the claims hereto appended.

In the drawing, forming part of this application and in which like designating characters refer to corresponding parts throughout the several views, Figure 1 is a front elevation partly in section of the picture frame as made in accordance with my invention.

Figure 1:
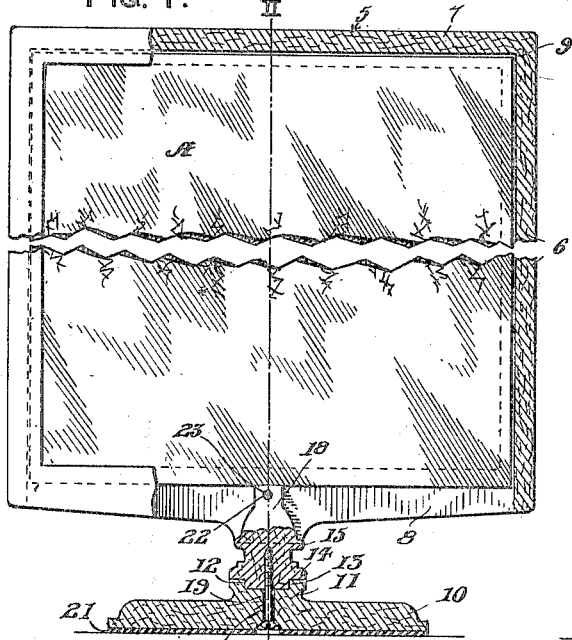

Referring to the drawing, the numeral 5 indicates the frame in its entirety and it consists of end rails 6, top rail 7 and a bottom rail 8. The frame shown in the drawing is rectangular but is to be understood that any other form of frame may be used if desired. End rails 6 and top and bottom rails have formed in their opposing sides a continuous groove or channel 9 in which the articles designated by the character A may be mounted, these articles being pictures, the glass covering and backing, or it may be a mirror if desired. The channel 9 opens out through the outer side of the bottom rail 8 to constitute an entrance opening so that the mounting of the pictures, mirrors or the like may be easily accomplished by simply sliding the articles through the opening into the continuous groove 9. The continuous groove 9 is of such depth that a sufficient space is provided after the articles are positioned within the frame so as to provide for the expansion and contraction of the glass covering for the pictures or of the glass from which the mirror is formed.

Figure 2:
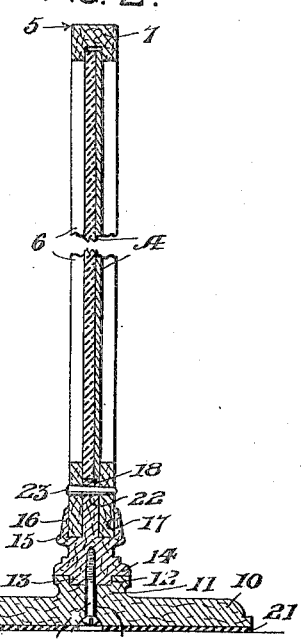
Fig. 2 is a vertical sectional view taken on line II—II of Fig. 1.

A supporting member 10 is provided on its upper side with a concentric boss 11 which has formed in its upper side a shallow recess 12 which is adapted to receive one end of the cylindrical body 13 of the combined supporting and retaining element. The combined supporting and retaining element body has formed on its exterior and adjacent one end an annular flange 14 which is adapted to have contact with the upper edge of the boss 11 when the said end of the body is mounted in the recess 12 of the boss. The opposite end of the body flares outwardly to provide an annular bead 15 and this bead has formed from its peripheral edge the diametrically opposing vertical lugs 16 which constitute frame engaging members when the body 13 is moved into frame engaging position as illustrated in Figs. 1 and 2 of the drawing.

The body 13 has formed on its upper side and centrally between the lugs 16 a penetrating tongue which tongue has its upper end reduced as at 18 so that it may be readily inserted between the side walls of the entrance slot formed in the bottom rail 8 of the frame thereby positioning the lugs 16 against the outer sides of this rail. By virtue of the engagement of the lugs with the rail 8 and the insertion of the tongue between the side walls of the slot formed in this rail relative rotational movement between the frame and body is obviated.

A fastening member 19 such as a nail, screw or the like is extended centrally through the supporting member 10 through the boss 11 and into the body 13 to rotatably connect the body with the supporting member so as to permit the frame to be moved in any position with relation to the supporting member as desired, it being understood that the supporting member 10 is provided centrally with the opening 20 in which the fastening means 19 is loosely mounted so as to permit of this rotational movement.

The underside of the supporting member 10 has secured thereto a suitable pad 21 of felt or other material so as to prevent the marring or scratching of the supports upon which the frame is positioned.

To insure a connection between the combined supporting and retaining member and frame, the tongue is provided with a transverse opening 22 which is adapted to aline with suitable transverse openings formed in the side walls of the entrance slot formed in the bottom rail 8 and these openings when alined are adapted to receive a tapered locking pin 23 therein so as to hold the members against accidental displacement relative to one another.

In operation, it will be apparent from the foregoing description taken in connection with the accompanying drawing that to mount a picture or mirror or a like article within the frame, it is necessary to disconnect the combined supporting and retaining member from the frame by removing the pin 23. The picture, mirror or the like is then slid through the entrance opening into the groove in the rails of the frame and the frame positioned back upon the combined supporting and retaining member until the reduced portion 18 of the tongue 17 engages the lower edge of the article mounted within the frame and at the same time alining its opening 22 with the openings in the bottom rail of the frame and the pin 23 replaced in these openings.

Figures 4, 5:
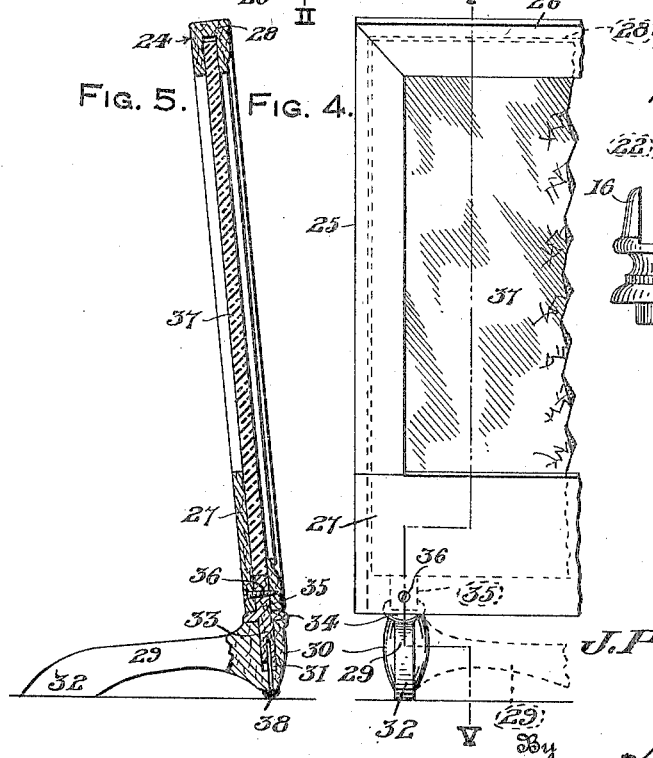
Fig. 4 is a fragmentary front elevation of a slightly modified form of the frame.
Fig. 5 is a sectional view taken on the line V—V of Fig. 4.
Figure 3:
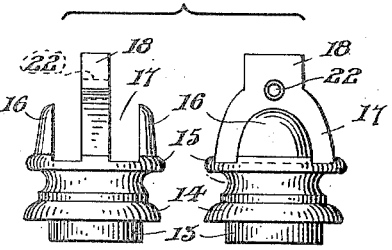
Fig. 3 is a front and side elevation of the combined supporting and retaining member.
Figure 6:
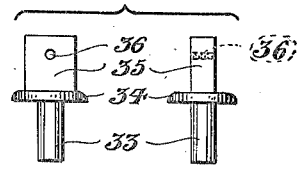
Fig. 6 is a front and side elevation of a slightly modified form of the combined supporting and retaining member.

In the modification illustrated in Figs. 4, 5, and 6, I designate the frame by the numeral 24, this frame having end rails 25, top rail 26 and a bottom rail 27. The opposing faces of the rails provided with a continuous groove 28 and a groove in the bottom rail 27 opening through the outer edge thereof to provide an entrance slot. It will be readily seen that this frame is of more heavy material and is particularly adapted for mirrors.

This frame is adapted to be supported in an inclined position upon any suitable supports such as bureaus, dressing tables, or the like, and to accomplish this I provide a pair of supporting members 29, each supporting member having one end enlarged as at 30 and provided with an inwardly extending bore 31 from its upper side, the opposite ends of the supporting members curved downwardly as at 32 so as to position the enlarged end 30 at an inclination thereto.

The combined supporting and retaining member has a cylindrical body 33 of sufficient diameter to permit it to be rotatably mounted in the bore 31 of the enlarged portion 30 of the supporting member. The upper end of this cylindrical body 33 is provided with an annular flange 34 which engages the upper edge of the enlarged portion to limit the inward sliding movement of the portion 33. A tongue 35 is formed centrally on and rises vertically from the upper side of the flange 34 and this tongue is provided centrally with a transverse opening 36 which is adapted to aline with transverse openings formed in the side walls of the bottom rail 27 of the frame 24 when the supporting members 29 are connected to the frame. It will be apparent that the tongues 35 are positioned between the side walls of the slot formed in the bottom rail 27 and are adapted to engage the lower edge of the mirror 37 which is slid through this entrance slot into the grooves 28 of the rails of the frame so as to retain this mirror in such position.

A combined supporting and pivoting pin 38 is extended through the bottom wall of the enlarged portion 30 and is embedded in the cylindrical body 33 of the combined supporting and retaining member so as to permit the supporting member 29 to be swung parallel with the bottom rail 27 of the frame so that they may be readily packed and shipped.

It will be apparent that in the modified form that there are two of these supporting members 29, one adjacent each end of the rail 27 and as both are identical in construction, it is believed that the above description for one will serve for all.

The mounting of the mirror 37 in this frame is identical with the mounting of the pictures or the like articles in the preferred form.

Having thus described my invention, what I claim is:

1. A picture frame of the class described including a frame body having an entrance slot in one rail thereof, a retaining member secured to said frame in said slot, and a supporting member secured to said retaining member as for the purpose specified.

2. A device of the class described including a frame having an entrance slot in one rail thereof, a retaining member removably secured to said frame and in the slotted rail, and a supporting member rotatably secured to the retaining member as for the purpose specified.

3. A picture frame of the class described including a frame body having end rails, top and bottom rail, the bottom rail provided with a longitudinal extending transverse slot opening out through the outer side thereof, a retaining member having a vertical tongue formed from one end thereof, said tongue adapted to be located between the side walls of the slot formed in the bottom rail of the frame, means for securing the retaining member to the frame, and a supporting means for the retaining member as for the purpose specified.

4. A picture frame of the class described comprising a frame body including end rails, top rail and bottom rail, opposing faces of said rails provided with a continuous groove and the groove in the bottom rail opening out through the outer side rail thereof forming an entrance slot, a combined retaining and supporting member having formed centrally from one end a tongue, means for removably securing the tongue between the side walls of the bottom rail centrally thereof and a supporting means secured to the combined supporting and retaining member as for the purpose specified.

5. In combination, a picture frame including end rails, a top and bottom rail, the opposing faces of said rails provided with a continuous communicating groove, the groove in the bottom rail opening out through the outer side thereof forming an entrance slot, a combined retaining and supporting member having a cylindrical body provided adjacent one end with an exteriorly arranged annular flange, the opposite end of said body provided with a bead having formed thereon at diametrically opposite points frame engaging lugs, a penetrating tongue formed centrally on and rising vertically over the beaded end of the body and the terminal of said tongue extending beyond the ends of the lugs, said tongue adapted to be arranged between the walls of the slot in the bottom rail of the frame and positioning the lugs against the exterior side faces of said rail, means for removably connecting said tongue in said slot and a supporting member rotatably secured to the free end of the body whereby said frame may be moved in various positions with relation to the support.

6. In combination, a frame having one rail provided with an entrance slot, a pair of combined supporting and retaining members removably secured in the slotted rail of the frame and supporting means secured to the combined supporting and retaining members as for the purpose specified.

In testimony whereof I affix my signature.

JOHN P. CLARY VON CARLSBERG.